United States Patent [19]

Morris

[11] Patent Number: 4,589,529

[45] Date of Patent: May 20, 1986

[54] SUSPENSION STRUTS FOR VEHICLES

[75] Inventor: Royston L. Morris, Gwent, Wales

[73] Assignee: Lucas Industries, Birmingham, England

[21] Appl. No.: 698,077

[22] Filed: Feb. 4, 1985

[30] Foreign Application Priority Data

Feb. 10, 1984 [GB] United Kingdom ................. 8403497

[51] Int. Cl.⁴ ............................................. F16F 9/36
[52] U.S. Cl. ............................. 188/322.17; 267/8 R; 280/668
[58] Field of Search ...................... 188/322.11, 322.12, 188/322.19; 267/8 R, 64.15; 280/668

[56] References Cited

U.S. PATENT DOCUMENTS 2,967,066  1/1961  Mueller ........................... 280/668 X
3,203,511  8/1965  Long ........................... 188/322.17 X
4,331,224  5/1982  Sano ................................. 280/668 X

FOREIGN PATENT DOCUMENTS 0103130  8/1980  Japan ............................. 188/322.17

Primary Examiner—Duane A. Reger
Attorney, Agent, or Firm—Laff, Whitesel, Conte & Saret

[57] ABSTRACT

In a suspension strut a piston-rod works through an elastomeric seal at the inner end of a tubular extension which depends from an end plug closing the upper end of cylinder. The seal comprises a collar which encircles the free end of the extension and is provided with a depending, contiguous, radial sealing flange which overlies the free end of the extension. The flange may be encircled by a retaining ring which enhances the grip of the flange against the rod, and the collar may be stiffened by a metal tubular former embedded in the material of the collar.

12 Claims, 4 Drawing Figures

SUSPENSION STRUTS FOR VEHICLES

This invention relates to improvements in suspension struts for vehicles of the kind in which a piston adapted to work in a cylinder is carried by a piston-rod which passes through a closure for one end of the cylinder, and the piston-rod works through a seal at the inner end of a tubular extension which depends from the closure and surrounds the piston-rod, volumes of gas or air and hydraulic fluid being retained in the cylinder by the seal, and the piston being provided with at least one valve or restrictor which permits a limited flow of hydraulic fluid past the piston in both directions in response to relative movement between the cylinder and the piston.

Suspension struts of the kind set forth may act as dampers to damp out oscillations between parts of a vehicle which are relatively movable against the loading of suspension springs. The suspension springs may be combined into assemblies with such dampers.

In GB-A-2 076 932. I disclose a suspension strut of the mono-tube type in which the seal at the inner end of the extension comprises at least one annular seal which is retained in a recess or in a portion of increased diameter at the free end of the extension.

According to my invention in a mono-tube suspension strut of the kind set forth the seal at the inner end of the tubular extension comprises a collar having a first portion which encircles the free end of the extension, and a second depending, contiguous, portion which includes a radial sealing flange projecting inwardly beyond the inner wall of the extension for sealing engagement with the rod.

The flange overlies the free end of the extension and the second portion may be encircled by a resilient retaining ring which acts to enhance the grip of the flange against the rod and the consequent effectiveness of the seal with the rod.

The provision of the collar simplifies the construction since the tubular extension may comprise a tube of constant diameter throughout its axial length which need not be modified to carry the collar.

The flange may be provided with at least one discrete annular rib for sealing engagement with the rod, and the first portion of the collar which encircles the tube may be provided with a plurality of axially spaced, radial, ribs for engagement with the outer face of the tubular extension.

The collar may comprise an elastomeric material moulded to, and stiffened by, a rigid tubular former, suitably of metal, and the former may have a radial flange for co-operation with the free end of the extension.

When the gas or air is trapped in an annular chamber above the level of the hydraulic fluid, the presence of the hydraulic fluid, assists in preventing the escape of gas or air past the seal. In addition, since the seal is immersed in the hydraulic fluid, the hydraulic fluid acts as a lubricant to reduce friction between the piston-rod and the seal.

Three embodiments of our invention are illustrated in the accompanying drawings in which.

Figure 1:
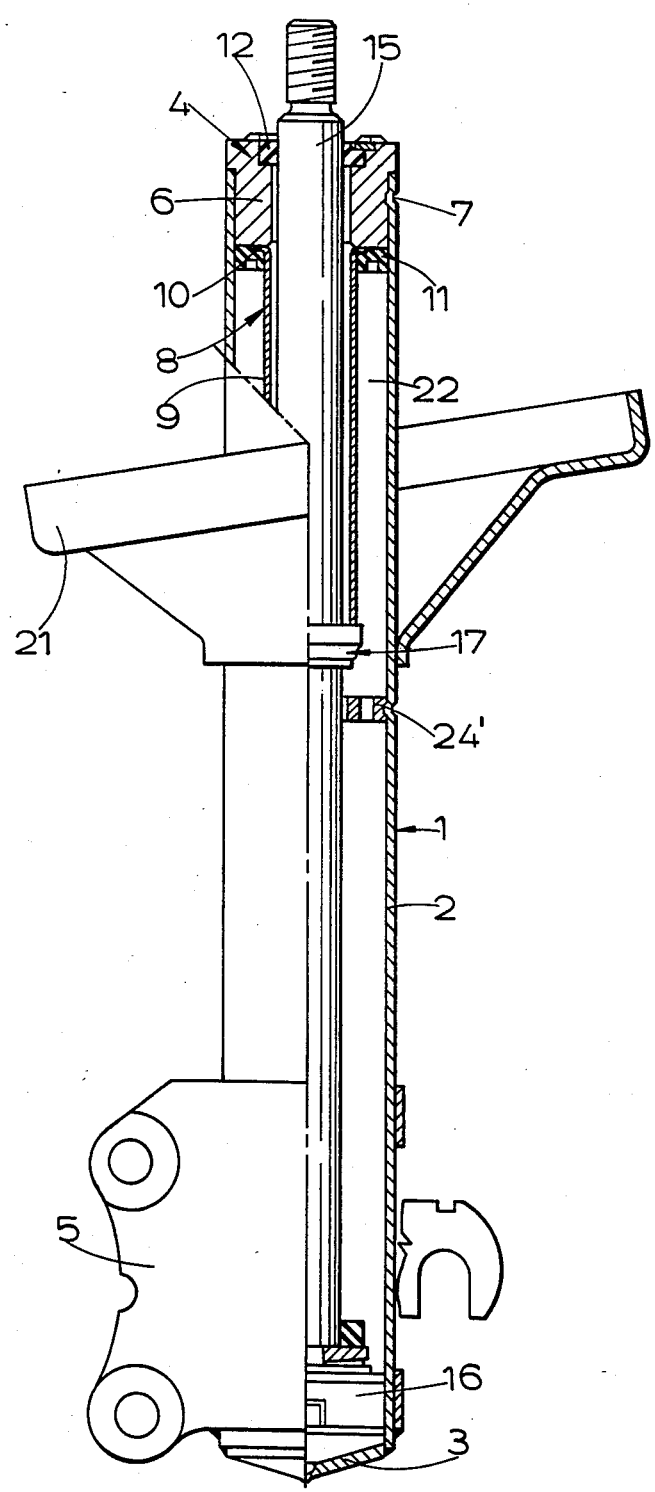
FIG. 1 is a longitudinal section of a suspension strut of the mono-tube type.
Figure 2:
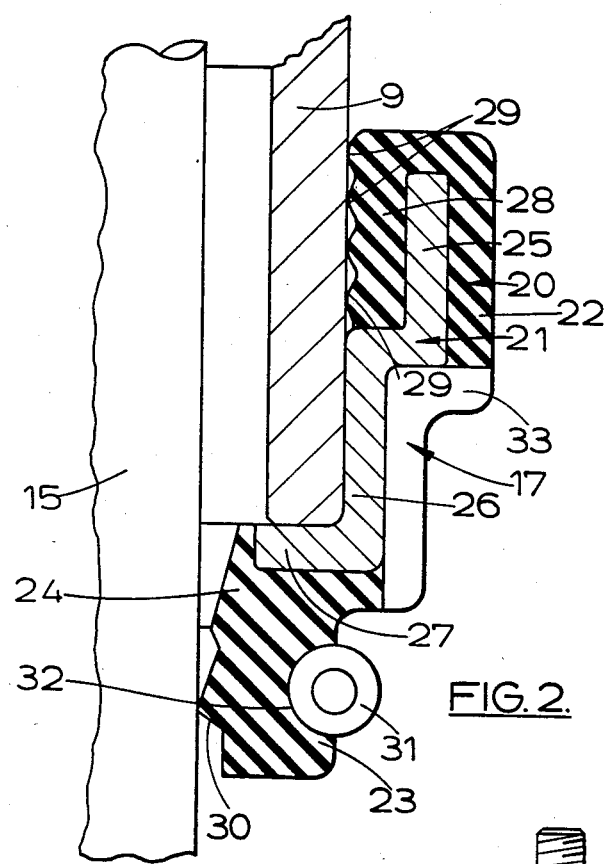
FIG. 2 is a longitudinal section on an enlarged scale of the free end of the tubular extension of FIG. 1.

The mono-tube strut illustrated FIGS. 1 and 2 of the drawings comprises a cylinder 1 in the form of a unitary cylindrical member 2 which is closed at its lower end by a closure 3 and at its upper end by a closure assembly 4. A bracket 5 fixed to the cylinder 1 at that lower end is adapted to carry a wheel (not shown).

The closure assembly 4 comprises an end plug 6 which is secured in position by a radial rib 7 pressed inwardly from the wall of the member 2, and a separate tubular support 8 comprising a cylindrical extension 9 of constant diameter throughout its axial length and which depends from an integral outwardly directed radial flange 10, and an annular sealing device 11 clamped between adjacent faces of the the flange 10 the extension 9 and the cylinder 2.

A piston-rod 15 projects through a seal 12 housed in an opening in the plug 6, and the bore of the extension 9 into the interior of the cylindrical member 2 and carries, at its lower free end, a piston 16 which, in turn, works in the bore of the cylindrical member 2. The piston-rod 15 works through an elastomeric seal 17 at the free inner end of the extension 9.

Due to the resilience of the material of the sealing device 11, the extension 9 is displaceable radially to compensate for variations in concentricity between the piston-rod 15 and the cylindrical member 2 thereby ensuring that the seal 17 seals effectively with the piston-rod 15 over the whole of its circumferential length.

The piston 16 is of known construction and is provided with oppositely acting one-way valves or restrictors.

The piston-rod 15 is secured at its upper end to a part of the chassis of frame of the vehicle.

Substantially the whole of the load on the wheel is supported by a suspension spring (not shown) which surrounds the cylindrical member 2 and abuts at its lower end against a flange 21 on the cylinder 1, and a complementary abutment on the piston-rod 15. A small proportion of the load is supported by a volume of gas or air under pressure in a pressure chamber 22 within the cylinder 1 and which is defined by the annular space between the closure assembly 4, the cylindrical member 2 and the extension 9. The remainder of the interior of the cylindrical member 2 is filled with hydraulic fluid to a level well above the height of the elastomeric seal 17 at the lower end of the extension 9.

Relative axial movement between the chassis or frame of the vehicle causes oscillations in the suspension spring to occur. These oscillations are damped out by relative axial movement between piston 16 and the cylindrical member 2 with the piston 16 working against the hydraulic fluid due to resistance to flow through the piston 16 by the one-way valves or restrictors in the piston 16.

The volume of the entering piston-rod 15 is accommodated by, and causes further pressurisation of, the gas or air.

Arranging for the elastomeric seal 17 to be located below the level of the hydraulic fluid ensures that the gas or air is separated from the seal 17 by the fluid. This means that the gas or air is prevented from contacting the seal 17 by the fluid itself. The presence of the fluid therefore assists in preventing the escape of gas or air past the seal 17.

In order to protect the seal 17 from damage by inpact from the piston 16, a radial stop 24 in the form of an apertured ring, which may also form a guide for the piston-rod 15, is housed in the cylindrical member 2 to limit movement of the piston 16 towards the seal 17.

The seal 17 comprises a collar 20 of elastomeric material which is moulded around a metal former 21. The seal 17 comprises a first portion 22 which encircles a lower end portion of the extension 9, and a second portion 23 contiguous with the first portion 21 and projecting below the said lower end portion. The second portion 23 includes a radial sealing flange 24 projecting inwardly beyond the inner wall of the extension 9 for sealing engagement with the rod 15.

The former 21 is of cylindrical, stepped, outline comprising portions 25 and 26 of greater and smaller diameter, with a radial flange 27 projecting radially inwards from the free end of the portion 26. The portion 26 co-operates with the external surface of the extension 9, and the flange 27 co-operates with the free end of the extension 9.

A sealing portion 28 of elastomeric material is held in sealing engagement with the extension 9 by the portion 25 of the former 21, and is provided with a plurality of axially spaced, annular ribs 29 to enhance the sealing effect with the extension 9.

The flange 24 overlies the free end of the extension 9 and has an annular sealing rib 30 of a diameter less than that of the internal diameter of the extension 9, for direct sealing engagement with the rod 15.

A resilient ring or garter spring 31 is received in a groove 32 in the external face of the flange 22 to enhance the sealing effect of the rib 30 with the rod 15, due to the resilience of the material of the second portion 23 and the flange 24.

The collar 20 can be assembled, simply by sliding it onto the free end of the extension 9, with the rib 29 gripping the extension 9 to hold the collar 20 in position.

The external surface of the collar 20 may be provided with a plurality of angularly spaced slots 33 to facilitate moulding and/or mechanical assembly.

Figure 3:
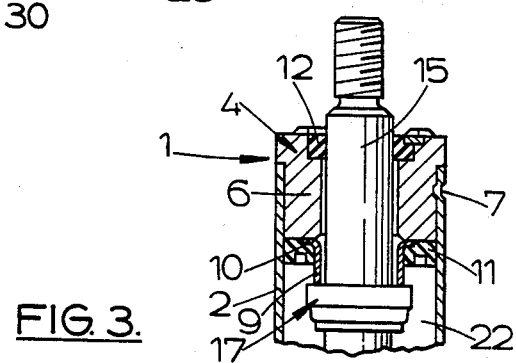
FIG. 3 is a longitudinal section of the upper end of the strut of FIG. 1 but showing a modification.

In the modified construction shown in FIG. 3 of the drawings, the cylindrical extension 9 is relatively short in length and the seal 17 at its free inner end is relatively close to the sealing device 11. In this modification the seal 17 is disposed above the level of the hydraulic fluid in the cylindrical member 2 and therefore provides a seal between the gas or air and the interior of the extension 9.

Since the extension 9 reduces substantially concentricity problems, we have found that the seal 17 is directly effective to prevent the escape of gas or air from the strut.

The modification of FIG. 3 is otherwise the same as the construction of FIGS. 1 and 2.

Figure 4:
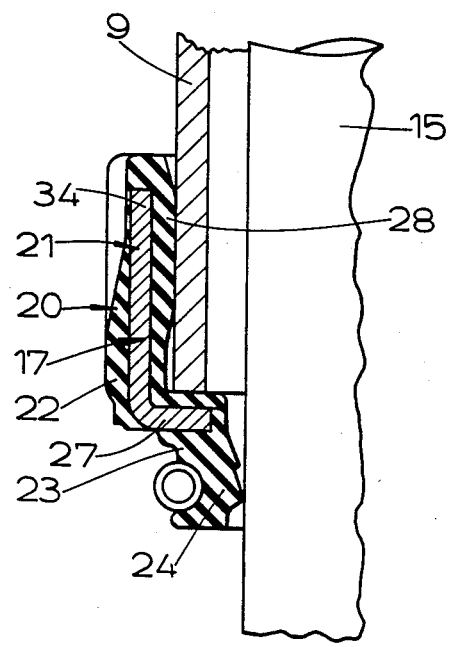
FIG. 4 is a section similar to FIG. 2, but showing a modified construction.

In the modified construction illustrated in FIG. 4 of the accompanying drawings and suitable for use with the struts of either FIGS. 1 and 2, or FIG. 3, the former 21 is of 'L' outline with the two portions 25 and 26 replaced by a single cylindrical portion 34. In such a construction the former 21 is completely embedded in the material of the collar 20 so that elastomeric material covering the interior faces of the portions 34 and 27 co-operates sealingly with the external surface of the extension 9, and with the free end of the extension 9, respectively. In this construction the ribs 29 may be omitted since adequate sealing could be provided by the facial contact of the portions 28 and 23 with the extension 9.

We claim:

1. A suspension strut for a vehicle comprising a cylinder, a piston adapted to work in said cylinder, a piston-rod carrying said piston, a closure for one end of said cylinder and through which said piston-rod passes into said cylinder, a tubular extension depending from said closure and surrounding said piston-rod to define an annular space between itself and said cylinder, said extension being separate from said closure and having a first end adjacent to said closure and second end remote from said closure, a first seal carried by said second end of said extension and through which said piston rod has a slidable sealing engagement, volumes of gas or air and hydraulic fluid retained in said cylinder, and restrictor means in said piston to permit a limited flow of said hydraulic fluid past said piston in both directions in response to relative axial movement between said piston and said cylinder, said gas or air being adapted to support at least a part of the load on said vehicle and to accommodate hydraulic fluid displaced within said cylinder by the volume of the entering piston-rod, wherein said first seal comprises a collar having a first portion which encircles said second end of said extension, a second, depending, continguous portion, and a radial sealing flange included in said second portion and projecting inwardly beyond said inner face of the extension for sealing engagement with said rod.

2. A strut as claimed in claim 1, wherein said flange overlies said second end of said extension.

3. A strut as claimed in claim 1, wherein a resilient retaining ring encircles said second portion.

4. A strut as claimed in claim 1, wherein said flange is provided with at least one discrete annular rib for sealing engagement with said rod.

5. A strut as claimed in claim 1, wherein said first portion of said collar which encircles said extension is provided with a plurality of axially spaced, radial, ribs for engagement with said outer face of said tubular extension.

6. A strut as claimed in claim 1, wherein said collar is of elastomeric material, and a rigid former is embedded in the material of said collar to stiffen the same.

7. A strut as claimed in claim 6, wherein said former has a radial flange for co-operation with said second end of said extension.

8. A strut as claimed in claim 6, wherein said former is separated from said extension by the material of the collar.

9. A strut as claimed in claim 7, wherein said radial flange on said former engages directly with said second end of said extension.

10. A strut as claimed in any of claim 6, wherein said former is of stepped outline having an end of smaller diameter, and said flange portion is disposed at said end of smaller diameter.

11. A strut as claimed in claim 1, wherein said seal is disposed above the level of said hydraulic fluid in said strut and acts to prevent the escape of said gas or air from said strut to the interior of said tubular extension.

12. A strut as claimed in claim 1, wherein said gas or air is trapped in said annular space above the level of said hydraulic fluid, and said seal is immersed in said hydraulic fluid.

* * * * *